(12) United States Patent
Li et al.

(10) Patent No.: US 8,750,678 B2
(45) Date of Patent: Jun. 10, 2014

(54) CONFERENCE RECORDING METHOD AND CONFERENCE SYSTEM

(71) Applicant: Huawei Technologies Co., Ltd., Guangdong (CN)

(72) Inventors: Kai Li, Shenzhen (CN); Pulin Wang, Shenzhen (CN); Xiaofei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/103,542

(22) Filed: Dec. 11, 2013

(65) Prior Publication Data

US 2014/0099075 A1 Apr. 10, 2014

Related U.S. Application Data

(63) Continuation of application No. PCT/CN2012/081220, filed on Sep. 11, 2012.

(30) Foreign Application Priority Data

Jan. 16, 2012 (CN) .......................... 2012 1 0012814

(51) Int. Cl.
*H04N 5/92* (2006.01)
*H04N 5/93* (2006.01)
*H04N 7/15* (2006.01)
*H04N 7/14* (2006.01)

(52) U.S. Cl.
CPC . *H04N 7/15* (2013.01); *H04N 7/147* (2013.01)
USPC .......................................... 386/241; 386/248

(58) Field of Classification Search
CPC .................................. H04N 7/15; H04N 7/147
USPC .......... 386/241, 239, 240, 248, 200, 224, 291
See application file for complete search history.

(56) References Cited

U.S. PATENT DOCUMENTS

| | | | |
|---|---|---|---|
| 6,195,117 B1 * | 2/2001 | Miyazaki | 348/14.09 |
| 7,464,137 B2 | 12/2008 | Zhu et al. | |
| 2005/0147378 A1 | 7/2005 | Hira | |
| 2005/0210105 A1 | 9/2005 | Hirata et al. | |
| 2008/0137558 A1 | 6/2008 | Baird | |
| 2009/0300520 A1 | 12/2009 | Ashutosh et al. | |
| 2010/0158203 A1 | 6/2010 | Mikan et al. | |
| 2010/0232579 A1 | 9/2010 | Hearn | |

(Continued)

FOREIGN PATENT DOCUMENTS

| | | |
|---|---|---|
| CN | 1601531 A | 3/2005 |
| CN | 1630357 A | 6/2005 |

(Continued)

*Primary Examiner* — Robert Chevalier
(74) *Attorney, Agent, or Firm* — Leydig, Voit & Mayer, Ltd.

(57) ABSTRACT

Embodiments of the present invention provide a conference recording method and a conference system. The conference recording method includes: extracting, based on a configuration file, key information of each site at each time point of multiple time points in a conference timeline, where the conference timeline is associated with a conference time, and the configuration file is used to define the key information of the conference and a format of a conference abstract; combining the key information of each site into a key index point, where the key index point is used as an index point for interacting with or editing a conference abstract; and integrating multiple key index points corresponding to multiple time points to form the conference abstract.

20 Claims, 5 Drawing Sheets

```
┌─────────────────────────────────────────────────────┐
│ Extract, based on a configuration file, key        │
│ information of each site at each time point of     │──── 11
│ multiple time points in a conference timeline       │
└─────────────────────────────────────────────────────┘
                          │
┌─────────────────────────────────────────────────────┐
│ Combine the key information of each site into       │──── 12
│ a key index point                                   │
└─────────────────────────────────────────────────────┘
                          │
┌─────────────────────────────────────────────────────┐
│ Integrate multiple key index points corresponding   │
│ to the multiple time points to form a conference    │──── 13
│ abstract                                            │
└─────────────────────────────────────────────────────┘
```

(56) References Cited

U.S. PATENT DOCUMENTS

| | | |
|---|---|---|
| 2011/0069085 A1 | 3/2011 | Weber et al. |
| 2011/0161074 A1 | 6/2011 | Pance et al. |

FOREIGN PATENT DOCUMENTS

| | | |
|---|---|---|
| CN | 1655609 A | 8/2005 |
| CN | 1662057 A | 8/2005 |
| CN | 1674672 A | 9/2005 |
| CN | 1783998 A | 6/2006 |
| CN | 1801726 A | 7/2006 |
| CN | 101346719 A | 1/2009 |
| CN | 101467423 A | 6/2009 |
| CN | 101502088 A | 8/2009 |
| CN | 101523392 A | 9/2009 |
| CN | 102572356 A | 7/2012 |

* cited by examiner

_(1)_
CONFERENCE RECORDING METHOD AND CONFERENCE SYSTEM

CROSS-REFERENCE TO RELATED APPLICATIONS

This application is a continuation of International Patent Application No. PCT/CN2012/081220, filed on Sep. 11, 2012, which claims priority to Chinese Patent Application No. 201210012814.8, filed on Jan. 16, 2012, both of which are hereby incorporated by reference in their entireties.

TECHNICAL FIELD

Embodiments of the present invention relate to the field of multimedia communications, and in particular, to a conference recording method and a conference system.

BACKGROUND

Multimedia communication is a new communication manner different from the conventional telephone communication. Multimedia communication further implements interaction between video and computer data based on voice interaction. An important feature of the multimedia communication is that both communicating parties are able to see an activity video and an environment video of each other. As it is more direct to transmit information through a video, video interaction can greatly improve communication quality.

Multimedia communication technologies are widely applied in a current video conference. Participants are able to quickly integrate into a conference with multimedia communication tools adopted in the conference. For example, a conference recording function through which a whole real-time multimedia communication process is recorded and can be played back as required can meet the demands such as a conference memo, after-conference training, and the like. In consideration of factors such as a processing capacity, a storage capacity, and a network bandwidth of an existing conference terminal system, people have been searching for an effective method that can save both storage resources and network bandwidth to record an ongoing multi-party conference in real time, so as to meet the demand such as deepening the understanding of the conference, especially the demand of quickly grasping conference content. Therefore, a feasible solution is to generate some conference abstracts, and key information of the conference is provided through the conference abstracts.

For example, an automatic face extraction technology for use in a recorded conference timeline has been proposed. In the technology, a face of a speaker is automatically detected, and a face image corresponding to each speaker is stored in a face database; a timeline is created to graphically identify the speaking time of a speaker in playing back a conference record; and face images are shown to identify each speaker associated with the timeline, which replaces a common manner of recognizing each user in a timeline. However, if only a face image is used as key information of a conference record, a conference abstract cannot fully provide subject content through which the participants have an overall grasp of the conference record. For example, performance enhancing technologies for a video conference are also proposed, where a conference server requests a key frame from a conference participant in response to determining that the conference participant should become a most active participant, and the conference server makes the conference participant the most active participant in response to receiving the key frame from the conference participant. Similarly, the performance enhancing method for the video conference also cannot fully enable the participants to have an overall grasp of the subject content of the conference record when watching the record abstract.

In addition, an online conference recording system is already provided to edit or open a conference record, and enables the participants to hear and watch the conference record during an online conference. The online conference record system still cannot fully enable the participants to have an overall grasp of the subject content of the conference record when watching the record abstract.

SUMMARY

Embodiments of the present invention provide a conference recording method and a conference system, so that participants can have an overall grasp of subject content of a conference record when watching a conference abstract.

In one aspect, a conference recording method is provided, including: extracting, based on a configuration file, key information of each site at each time point of multiple time points in a conference timeline, where the conference timeline is associated with a conference time, and the configuration file is used to define the key information of the conference and a format of a conference abstract; combining the key information of each site into a key index point, where the key index point is used as an index point for interacting with or editing a conference abstract; and integrating multiple key index points corresponding to the multiple time points to form the conference abstract.

In another aspect, a conference system is provided, including: an extraction unit, configured to extract, based on a configuration file, key information of each site at each time point of multiple time points in a conference timeline, where the conference timeline is associated with a conference time, and the configuration file is used to define the key information of the conference and a format of a conference abstract; a combination unit, configured to combine the key information of each site into a key index point, where the key index point is used as an index point for interacting with or editing a conference abstract; and an integration unit, configured to integrate multiple key index points corresponding to the multiple time points to form the conference abstract.

The conference recording method and the conference system provided by the embodiments of the present invention can automatically generate a conference abstract based on a self-defined configuration file that can be revised at any time, and present the conference abstract, so as to obtain more detailed conference information through the key index points in the conference abstract.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In order to enable a watcher to easily have an overall grasp of a conference, a conference abstract may be generated in a multi-point video conference based on key index points. In addition, a real-time interaction with information in the conference abstract may be achieved.

A conference recording method provided by an embodiment of the present invention is specifically described in the following with reference to FIG. 1 to FIG. 3.

Figure 1:
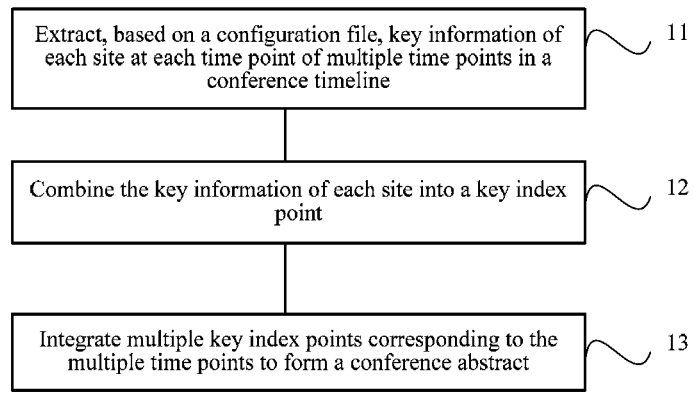
FIG. 1 is a flow chart of a conference recording method according to an embodiment of the present invention.
Figure 2:
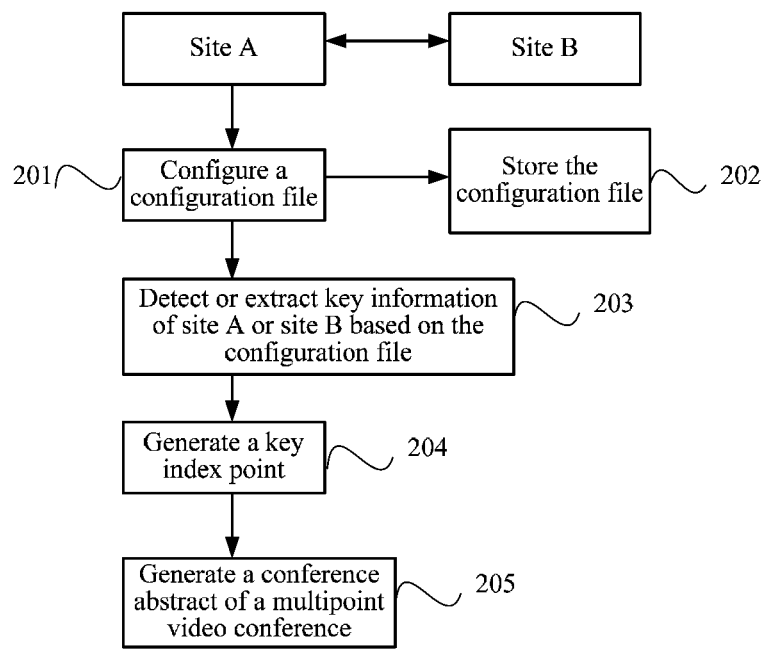
FIG. 2 is a schematic flow chart of a conference recording method according to an embodiment of the present invention.

The conference recording method shown in FIG. 1 includes the following steps:

11: A conference system may extract, based on a configuration file, key information of each site at each time point of multiple time points in a conference timeline, where the conference timeline is associated with a conference time, and the configuration file is used to define the key information of the conference and a format of a conference abstract.

Optionally, before the key information of each site based on a configuration file is extracted, the conference system further needs to generate a configuration file, where the configuration file may be generated in a man-machine interaction manner, or may be self-defined in advance. After the configuration file is generated, the conference system automatically stores the configuration file. In this way, after a configuration file is generated in a site, one or more other sites may acquire the configuration file from the conference system.

In addition, the configuration file may include an audio/video detection and recognition module, a key information extraction module, an event determination and analysis module, and the like. For example, these modules may implement detection and recognition of a face, detection and recognition of a voice of a designated participant, detection and recognition of a movement or a behavior of a designated person, detection and recognition of information on which multipoint conference participants all focus, demonstration of a specified product, special demands of a disabled person, voice amplification of a specified speaker, partial amplification of information of a specified product, and the like.

As described above, the configuration file defines key information of the conference. The key information may include one or more of the following: a face image, a voice, a body movement, a key frame, a speech draft, and a specified event. The specified event refers to some special events occurring during a conference, for example, handing up to ask a question, dozing off, being listlessly, lowering the head, laughing, crying, absence, and the like, and may also include other self-defined events.

Optionally, the configuration file also defines the format of a conference abstract to be generated, for example, a text file, an audio file, a video file, a Flash file, a PPT file, or the like.

Optionally, the configuration file also defines a manner of generating a conference abstract of the foregoing format.

12: The conference system combines the key information of each site into a key index point, where the key index point is used as an index point for interacting with or editing a conference abstract.

In this way, the conference system combines key information of each site into key index points corresponding to all information included in the key information.

For example, in the case that key information defined by a configuration file includes a face image and voice, face key information and voice key information that are corresponding to a time point in a conference timeline in each site are extracted, and are combined into a key index point.

In a method for organizing and arranging key information in certain mode to form a key index point, for example, when sorting is performed according to characters, sorting may be performed according to a sequence of participants participating in the conference, where positions of important characters are arranged from the middle to the two sides, or from the left to the right; after sorting is performed according to the characters, voices are simultaneously arranged for each character to ensure labial synchronization. For another example, when sorting is performed according to a specified focal event in the obtained key information, the specified focal event may be obtained and marked; then is accompanied with an associated character as a foil, and finally is accompanied with a commentary to explain the specified event.

13: The conference system integrates multiple key index points corresponding to the multiple time points to form the conference abstract.

Because there are multiple time points in a conference timeline, the conference system integrates a key index point corresponding to each time point to form a conference abstract. A format of the conference abstract may be determined according to the configuration file.

The generated conference abstract may be presented on a conference display screen in each site in the form of a picture or an icon. Participants may have an overall grasp of the subject content of a previous conference through watching the conference abstract.

It can be seen from the above that, the conference recording method provided by the embodiment of the present invention can automatically generate a conference abstract based on a self-defined configuration file that can be revised at any time, and present the conference abstract, so as to obtain more detailed conference information through the key index point in the conference abstract.

A process of generating a conference abstract of a video conference by using a conference recording method according to an embodiment of the present invention is specifically described in the following with reference to FIG. 2, and two sites of a video conference are taken as an example.

For example, the two sites engaging in a video conference are referred to as "site A" and "site B". 201: Generate a configuration file in site A through manual configuration or automatic configuration, and store the generated configuration file in 202. In this way, site B may also use the generated configuration file. The configuration file may define the following information: a face image, a body movement (for example, a gesture or a posture), a voice, a PPT play status, a conference scenario, an event (an emergency, for example a person runs suddenly, a demonstrated product falls to the ground, the conference is interrupted suddenly, most participants leave, most participants play cell phones or doze off, and the like), a brief introduction to the participants (gender, age, knowledge background, hobbies, and the like), and the like.

203: Detect or extract, based on the configuration file, key information of site A and/or site B in the conference system of site A. For example, key information is generated by a face detection module, a face recognition module, a gesture recognition module, a posture recognition module, a voice recognition module, a PPT determination module, an event detection module, a specified scenario modeling detection module, and the like.

204: Generate a key index point of the video conference based on the key information, where the key index point is a set of multiple pieces of key information. Finally, 205: integrate, based on the key index point, the key index points generated at multiple time points/time periods to generate a conference abstract of the video conference.

Figure 3:
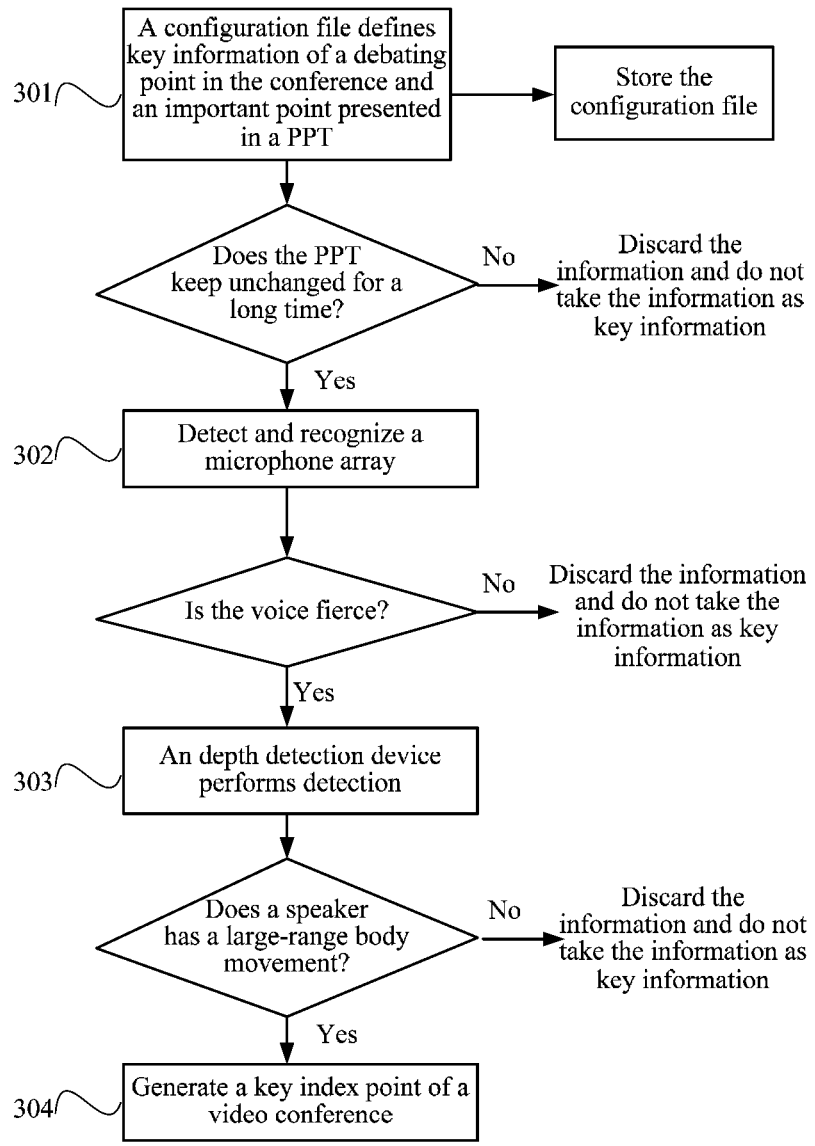
FIG. 3 is a flow chart of generating a key index point according to an embodiment of the present invention.

FIG. 3 shows a specific embodiment to illustrate a manner of generating a key index point. For example, a configuration file of a conference system of site A defines information of a debating point in the conference and an important point presented in a PPT. First, 301: determine whether the PPT played in site A keeps unchanged for a long time; if not, discard the information and do not take the information as key information; if the played PPT keeps unchanged for a long time, it indicates that the PPT content may be an important focus in the conference, and then, key information of the important point presented in the PPT is generated. Then, 302: detect and recognize a microphone array; if the detected voice is not fierce, it indicates that a discussed subject is not a debating point in the conference, and discard the voice information and do not take the voice information as the key information; otherwise, record the voice information. Simultaneously, 303: detect whether a speaker has a large-range body movement by a depth obtaining device; if not, discard the movement information and do not take the movement information as the key information; otherwise, record the movement information. Generate key information of a conference debating point based on the recorded voice information and movement information. Finally, 304: generate a key index point of the video conference based on the generated key information of an important point presented in the PPT and the generated key information of a debating point in the conference.

In other words, after key information of a conference is obtained, the key information may be organized and arranged in certain mode to generate a key index point. For example, a key index point may be generated by sorting characters. First, sorting is performed according to a sequence of participants, positions of important characters are arranged from the middle to the two sides, or from the left to the right; then, after sorting is performed according to the characters, voices are simultaneously arranged for each character to ensure labial synchronization.

Finally, the key index points of all time points are integrated and are associated with the timeline, thereby generating a conference abstract of the video conference. For example, multiple key index points are connected in series in certain motion mode, which solves the problem about how to switch between two consecutive key index points. A self-defined animation may be added in a way similar to a PPT playing manner to make two consecutive key index points be associated. Alternatively, definition may be performed according to a character association mode in a conference scenario, including the following steps: obtaining character information at two consecutive key index points; then, determining the character and performing association; if the character appears twice at the two consecutive key index points, taking the character as an object of a movement definition, so as to define a consecutive movement of the character as a play movement at the two consecutive key index points; if there is no character, taking the voice of a speaker as a key movement, and defining the strength and speed of a movement at a corresponding key index point according to the stress and rhythm of the voice; if there is neither a character nor a voice, taking a PPT switching manner in the video conference as a play movement at the two consecutive key index points; if there is no character, no voice, and no PPT, a user defines a play movement at the key index point by default.

To obtain a better conference abstract, a participant may interact with or edit the conference abstract according to key information in the conference abstract, for example, add information associated with the key information.

Optionally, when a participant clicks a face image of a participant in a conference abstract, brief information of the participant is displayed in real time or a further reference index is provided.

Optionally, when a participant clicks key information, the participant needs to obtain a video of an original video conference related to the key information, and then hops to a video clip of the original video conference according to the key information.

Optionally, when a participant previews a PPT speech draft presented in a certain site, a user may obtain the PPT speech draft, or automatically send the PPT speech draft to a predefined user email.

Optionally, when a participant previews a lot of key information of a body movement, a voice information clip or a video clip corresponding to the body movement may be associated.

Alternatively, when previewing a lot of face key information, a participant may obtain related basic information of all participants, may further obtain speech movement information, key voice information, and even summarized speech characteristic information of a certain participant in the multi-point conference, and even may call a corresponding participant.

It can be seen from the above that, the interacting with a conference abstract according to key information in the conference abstract includes: if the key information includes a face image, obtaining information of a participant corresponding to the face image, and learning a conference speech of the participant or communicating with the participant; if the key information includes a speech draft, obtaining the file information of the speech draft; if the key information includes a voice or a body movement, obtaining information of an object of the voice or the body movement; and if the key information includes product information, obtaining other information of the product.

The following takes two simplest sites as an example to describe a manner of interacting with a conference abstract.

If participant A in a first site wants to communicate with participant B in a second site, participant A may select the face image of participant B from a conference abstract; if the face image of participant B can match a face image in the face information database of the conference, the basic information of participant B is introduced into the conference abstract, and participant A may further learn speech information related to participant B in the conference. If the provided basic information of participant B includes instant messenger (Instant Messenger, IM) information, participant A may talk with participant B through the IM. If the provided basic information of participant B includes email (email) information, participant A may contact participant B through emails. In addition, if the provided basic information of participant B includes body movement information, participant A may quickly learn a speech style of participant B.

Furthermore, an audience may interact with a speaker in real time. For example, an audience is interested in a certain part of a PPT speech draft, and points at this part of the PPT speech draft; a camera or a sensor obtains and recognizes a corresponding position in the PPT speech draft, and circles the corresponding position in the PPT speech draft; and then, a speaker learns that the audience is interested in the part of the PPT speech draft, and explains this part in detail. Alternatively, a speaker repeatedly and loudly explains certain important topics or important parts of a PPT speech draft, probably with some habitual movements, which can be distinguished by a voice recognition module, and a gesture and posture recognition module, and fed back to a display screen of a conference system in a site where the audience is seated or to a conference system where the audience joins in.

In addition, if key information includes a character, related brief introduction information of the character is added, and the information related to the character may be provided through a link, that is, when an indication device of the conference system moves onto the face of the character, the conference system indicates which information of the character is to be displayed. After the information of the character is displayed, the conference system indicates whether a further interaction is needed. For example, if it is an online real-time conference abstract, an online chat prompt is sent in real time, and a chat program is initiated, including manners such as a text chat, a voice chat, and a video chat; if it is an offline conference abstract, a user is prompted whether to send an email.

Optionally, if the key information includes a conference file, further information is provided to a user through a link. For example, when a user wants to obtain the file, the conference system indicates how to obtain the file, how to apply for the file permission, and other information.

Optionally, if the key information includes product information, a user is further provided with product information of the product through a link, for example, a source, a manufacturer, and a three-dimensional display model of the product are provided.

In addition, a participant may also edit a conference abstract according to key information in the conference abstract. For example, editing a character includes associating more information, whether to initiate a chat program, whether to initiate an email (email) program, whether to automatically send an email, whether to serve as a specified character or leader, whether to timely display a brief introduction to a character, and the like; the editing a character further includes adding a description of a character, for example, a body movement description, a background knowledge description, a speech condition description, and the like. For example, the editing a character further includes analyzing a behavioral habit of a major speaker through a computer vision algorithm based on a body movement of the major speaker, and then taking the behavioral habit as a characteristic of the character. The editing a character also includes classifying the participants.

More information may be associated during the editing a conference abstract according to the face information included in the key information, for example, a description of a character is added, such as a body movement description, a background knowledge description, and a speech condition description; or the participants are classified.

During editing a conference abstract according to a movement included in the key information, an editing operation may be performed based on an automatic study result of a body movement of a major speaker. For example, after the whole video conference ends, behavioral habits of a major speaker are analyzed by using a computer vision algorithm, and the habits are added to the basic information of the character as a characteristic of the character.

Alternatively, correlation and arrangement of the key information is performed, and a switch motion is defined for the key index points generated according to the key information, such as a slow change or a rapid change, coherence on a time shaft.

A schematic structural diagram of a conference system according to an embodiment of the present invention is described in the following with reference to FIG. 4 to FIG. 7.

Figure 4:
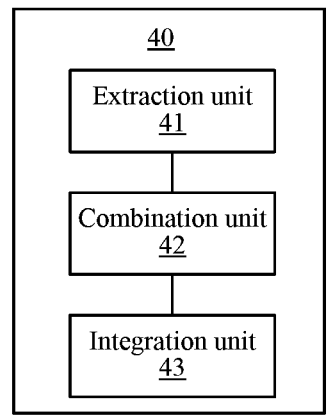
FIG. 4 is a schematic structural diagram of a conference system according to an embodiment of the present invention.

As shown in FIG. 4, a conference system 40 includes an extraction unit 41, a combination unit 42, and an integration unit 43. The extraction unit 41 is configured to extract, based on a configuration file, key information of each site at each time point of multiple time points in a conference timeline, where the conference timeline is associated with a conference time, and the configuration file is used to define the key information of the conference and a format of a conference abstract. The combination unit 42 is configured to combine the key information of each site into a key index point, where the key index point is used as an index point for interacting with or editing a conference abstract; that is, the combination unit 42 is configured to combine the key information of each conference into key index points corresponding to all information included in the key information. The integration unit 43 is configured to integrate multiple key index points corresponding to the multiple time points to form the conference abstract.

Generally speaking, the configuration file includes an audio/video detection and recognition module, a key information extraction module, an event determination and analysis module. The key information includes one or more of the following: a face image, a voice, a body movement, a key frame, a speech draft, and a self-defined event. The format of the conference abstract is a text file, an audio text, a video file, a flash file, or a PPT file.

Figure 5:
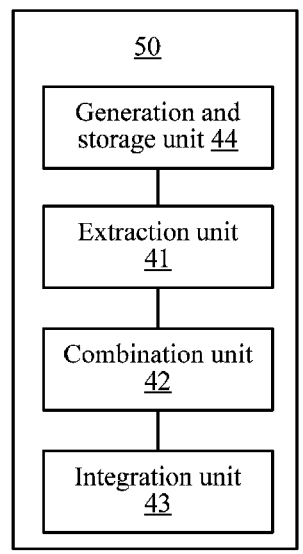
FIG. 5 is a schematic structural diagram of a conference system according to an embodiment of the present invention.

In FIG. 5, in addition to the extraction unit 41, the combination unit 42, and the integration unit 43, the conference system 50 further includes a generation and storage unit 44, configured to generate and store a configuration file before the key information of each site is extracted based on the configuration file, so that the configuration file is acquired by one or more other sites.

Figure 6:
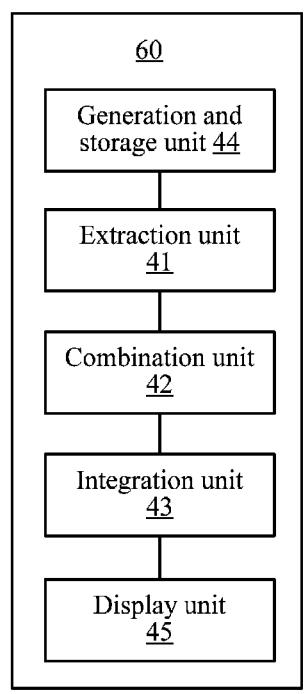
FIG. 6 is a schematic structural diagram of a conference system according to an embodiment of the present invention.

In FIG. 6, in addition to the extraction unit 41, the combination unit 42, the integration unit 43, and the generation and storage unit 44, a conference system 60 further includes a display unit 45, configured to present the conference abstract in the form of a picture or an icon.

Figure 7:
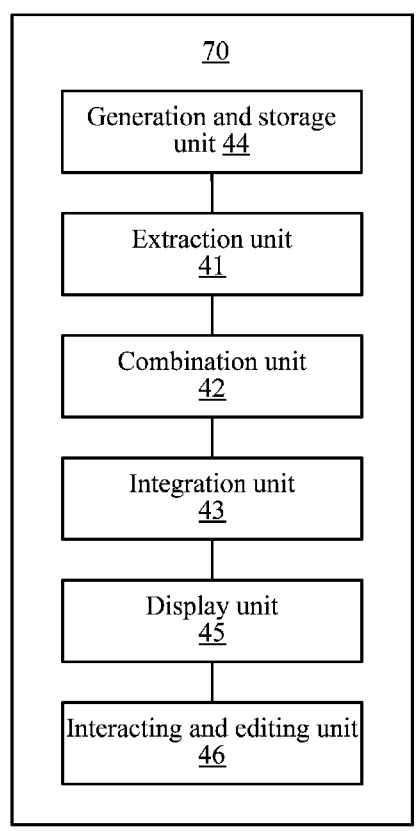
FIG. 7 is a schematic structural diagram of a conference system according to an embodiment of the present invention.

In FIG. 7, in addition to the extraction unit 41, the combination unit 42, the integration unit 43, the generation and storage unit 44, and the display unit 45, a conference system 70 further includes an interacting and editing unit 46, configured to interact with or edit a conference abstract according to key information in the conference abstract. The interacting and editing unit 46 is specifically configured to: if the key information includes a face image, obtain information of a participant corresponding to the face image, and learn a conference speech of the participant or communicate with the participant; if the key information includes a speech draft, obtain file information of the speech draft; if the key information includes a voice or a body movement, obtain information related to an object of the voice or the body movement. Alternatively, the interacting and editing unit 46 is specifically configured to add, according to the a face information included in the key information, a body movement description, a background knowledge description, and a speech condition description for a character, or classify participants; or perform, according to a movement included in the key information, an editing operation based on an automatic study result of a body movement of a major speaker; or associate and arrange the key information, and then define a switch motion for the key index points generated according to the key information.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A conference recording method, comprising:
   extracting, based on a configuration file, key information of each site at each time point of multiple time points in a conference timeline, wherein the conference timeline is associated with a conference time, and the configuration file is used to define the key information of the conference and a format of a conference abstract;
   combining the key information of each site into a key index point, wherein the key index point is used as an index point for interacting with or editing the conference abstract; and
   integrating multiple key index points corresponding to the multiple time points to form the conference abstract.

2. The method according to claim 1, before the extracting, based on the configuration file, the key information of each site, further comprising: generating and storing the configuration file, so that the configuration file is acquired by one or more other sites.

3. The method according to claim 1, wherein the configuration file comprises an audio/video detection and recognition module, a key information extraction module, or an event determination and analysis module.

4. The method according to claim 1, wherein the key information comprises one or more of the following: a face image, a voice, a body movement, a key frame, a speech draft, and a self-defined event.

5. The method according to claim 1, wherein the combining the key information of each site into the key index point comprises:
   Combining the key information of each site into key index points corresponding to all information comprised in the key information.

6. The method according to claim 1, wherein the format of the conference abstract is a text file, an audio file, a video file, a flash file, or a PPT file.

7. The method according to claim 1, wherein the conference abstract is presented in the form of a picture or an icon.

8. The method according to claim 1, further comprising: interacting with or editing the conference abstract according to the key information in the conference abstract.

9. The method according to claim 8, wherein the interacting with the conference abstract according to the key information in the conference abstract comprises:
   when the key information comprises a face image, obtaining information of a participant corresponding to the face image, and learning a conference speech of the participant or communicating with the participant;
   when the key information comprises a speech draft, obtaining file information of the speech draft; and
   when the key information comprises a voice or a body movement, obtaining information related to an object of the voice or the body movement.

10. The method according to claim 8, wherein the editing the conference abstract according to the key information in the conference abstract comprises at least one of the following (a), (b) and (c):
   (a) adding, according to face information comprised in the key information, a body movement description, a background knowledge description, and a speech condition description for a character, or classifying participants;
   (b) performing, according to a movement comprised in the key information, an editing operation based on an automatic study result of a body movement of a major speaker; and
   (c) associating and arranging the key information, and then defining a switch motion for the key index points generated according to the key information.

11. A conference system, comprising:
   an extraction unit, configured to extract, based on a configuration file, key information of each site at each time point of multiple time points in a conference timeline, wherein the conference timeline is associated with a conference time, and the configuration file is used to define the key information of the conference and a format of a conference abstract;
   a combination unit, configured to combine the key information of each site into a key index point, wherein the key index point is used as an index point for interacting with or editing the conference abstract; and
   an integration unit, configured to integrate multiple key index points corresponding to the multiple time points to form the conference abstract.

12. The conference system according to claim 11, further comprising a generation and storage unit, configured to generate and store a configuration file before the key information of each site is extracted based on a configuration file, so that the configuration file is acquired by one or more other sites.

13. The conference system according to claim 11, wherein the configuration file comprises an audio/video detection and recognition module, a key information extraction module, or an event determination and analysis module.

14. The conference system according to claim 11, wherein the key information comprises one or multiple of the following: a face image, a voice, a body movement, a key frame, a speech draft, and a self-defined event.

15. The conference system according to claim 11, wherein the combination unit is further configured to:
   combine the key information of each site into key index points corresponding to all information comprised in the key information.

16. The conference system according to claim 11, wherein the format of the conference abstract is a text file, an audio file, a video file, a flash file, or a PPT file.

17. The conference system according to claim 11, further comprising a display unit, configured to present the conference abstract in the form of a picture or an icon.

18. The conference system according to claim 11, further comprising: an interacting and editing unit, configured to interact with or edit the conference abstract according to the key information of the conference.

19. The conference system according to claim 18, wherein the interacting and editing unit is configured to:
   if the key information comprises a face image, obtain information of a participant corresponding to the face image, and learn a conference speech of the participant or communicate with the participant;
   if the key information comprises a speech draft, obtain file information of the speech draft; and
   if the key information comprises a voice or a body movement, obtain information related to an object of the voice or the body movement.

20. The conference system according to claim 18, wherein the interacting and editing unit is configured to implement at least one of the following (a), (b) and (c):
   (a) adding, according to a face information comprised in the key information of the conference, a body movement description, a background knowledge description, and a speech condition description for a character, or classify participants;
   (b) performing, according to a movement comprised in the key information of the conference, an editing operation based on an automatic study result of a body movement of a major speaker; and
   (c) associating and arranging the key information of the conference, and then define a switch motion for the key index points generated according to the key information of the conference.

* * * * *